US012478879B1

(12) United States Patent
Cloud et al.

(10) Patent No.: US 12,478,879 B1
(45) Date of Patent: Nov. 25, 2025

(54) ASSIGNING MULTIPLIERS TO SQUARES IN LINEUPS

(71) Applicant: SidePrize LLC, Atlanta, GA (US)

(72) Inventors: Grant Cloud, Atlanta, GA (US); Robert Landerman, Atlanta, GA (US); Dae Kang, Atlanta, GA (US); Andrew Barron, Atlanta, GA (US); Skyler Kaufman, Atlanta, GA (US); Samuel Garvis, Atlanta, GA (US); Neil Jagtiani, Atlanta, GA (US)

(73) Assignee: SidePrize LLC, Atlanta, GA (US)

( * ) Notice: Subject to any disclaimer, the term of this patent is extended or adjusted under 35 U.S.C. 154(b) by 0 days.

(21) Appl. No.: 18/916,195

(22) Filed: Oct. 15, 2024

(51) Int. Cl.
*A63F 13/58* (2014.01)
*A63F 13/828* (2014.01)

(52) U.S. Cl.
CPC ............ *A63F 13/58* (2014.09); *A63F 13/828* (2014.09)

(58) Field of Classification Search
CPC ............................... A63F 13/58; A63F 13/828
See application file for complete search history.

(56) References Cited

U.S. PATENT DOCUMENTS

2012/0202599 A1 8/2012 Cohen
2014/0370966 A1 12/2014 Bahou
2016/0082358 A1 3/2016 Bahou
2021/0008458 A1 1/2021 Wang et al.
2022/0028224 A1 * 1/2022 Proskey ............. G07F 17/3288
2022/0203247 A1 6/2022 Martin
2023/0001287 A1 1/2023 Orlow
2023/0410591 A1 * 12/2023 Monteverdi ........ G07F 17/3209

OTHER PUBLICATIONS

International Search Report and Written Opinion received in International application No. PCT/US24/51993.

* cited by examiner

*Primary Examiner* — Thomas H Henry
(74) *Attorney, Agent, or Firm* — Bradley Arant Boult Cummings LLP; Adam J. Thompson, Esq.

(57) ABSTRACT

The disclosed system discussed herein may include systems, methods, and devices for dynamically adjusting contest parameters for a fantasy sports contest. A performance indicator (e.g., passing yards, rushing yards, points scored, assists, rebounds, or goals) associated with a fantasy sports player may be received from a participant of a fantasy sports contest. A selection of a multiplier (e.g., selected from a predefined range that includes values from 2× to 20×) associated with the performance indicator may be received from the participant of the fantasy sports contest. A performance threshold for the fantasy sports player may be determined based on the multiplier. An award may be transmitted to the participant based on the performance threshold and an outcome associated with the selection.

15 Claims, 6 Drawing Sheets

ASSIGNING MULTIPLIERS TO SQUARES IN LINEUPS

TECHNICAL FIELD

The present disclosure generally relates to systems and methods for selecting squares in a player lineup and, more specifically, assigning multiplier modifiers based on one or more selections by a user.

BACKGROUND

Fantasy sports, a genre of online gaming where participants assemble imaginary or virtual teams composed of proxies of real players of a professional sport, have seen an increase in popularity and engagement in recent years. These fantasy sports platforms allow users to compete against others by building teams based on the performance of the players in actual games. Existing models in fantasy sports platforms provide limited engagement strategies beyond traditional team management and scoring systems. While these platforms offer a robust framework for fantasy sports engagement, they often fail to fully exploit the potential for strategic complexity and the dynamic adjustment of payout scenarios based on how easy or difficult it is to win the specific fantasy sports contest, which could significantly enhance user experience and engagement.

Fantasy sports contests have revolutionized the way fans engage with sports, allowing participants to assemble virtual teams of real athletes and compete based on the athletes' real-world performances. Fantasy sports contest platforms have experienced a significant increase in popularity, driven by their ability to connect sports enthusiasts in a competitive and interactive environment. Conventional fantasy sports contest platforms have relied on static scoring mechanisms where participants select players and accumulate points based on those players' performances in actual games. While conventional fantasy sports contest platforms provide a foundational level of engagement, they often lack flexibility in gameplay strategy and do not fully address the varying confidence levels participants may have in their lineup decisions.

Current models in conventional fantasy sports contest platforms typically restrict participants to standard scoring and fixed payout structures, which do not allow for dynamic adjustments based on participant strategy or real-time game developments. This limitation often results in a homogeneous gaming experience that can diminish user engagement over time. Participants are left with limited options for differentiating their strategies from those of other players, leading to a predictable and less engaging contest environment. Moreover, traditional fantasy sports contest platforms do not accommodate participants' desire to leverage their sports knowledge and insights into more nuanced or tailored risk-reward scenarios. There is a lack of mechanisms that allow participants to directly influence the potential outcomes based on their predictions or confidence levels. This gap prevents participants from fully exploiting their analytical skills and sports understanding in pursuit of greater rewards.

Given these limitations, there is a significant need for a more flexible and dynamic system within the fantasy sports domain that can cater to the strategic depth and engagement preferences of modern participants. Enhancing the interactive capabilities of fantasy sports platforms, particularly through the introduction of variable gaming strategies that adapt to participant inputs and real-time sports data, could significantly improve the overall user experience and sustain participant interest and involvement in fantasy sports contests. The industry thus faces technical challenges including maintaining robust and reliable data processing capabilities and introducing flexible, participant-driven mechanics that enrich the strategic complexity and financial incentives of fantasy sports contests.

This background information is provided to reveal information believed by the applicant to be of possible relevance. No admission is necessarily intended, nor should be construed, that any of the preceding information constitutes prior art.

SUMMARY

Briefly described, and in various embodiments, the present disclosure generally relates to interactive gaming and digital entertainment, specifically within the context of fantasy sports. Moreover, the present disclosure is particularly relevant to systems and methods for personalizing and dynamically adjusting game parameters in response to user selections of players, performance indicators, and multipliers, thereby enhancing the strategic complexity and engagement of fantasy sports contests.

According to some aspects, a computing infrastructure (e.g., a computing environment, a client device, and various external resources) is provided for dynamic participant interaction and strategic gameplay. By allowing participants to adjust game parameters through user-selected multipliers, the static nature of traditional fantasy sports may be transformed into a dynamic and engaging strategic experience. Moreover, aspects of the disclosure may address the need for enhanced user engagement and allows participants to leverage their sports knowledge more effectively.

One significant advancement of the system is the dynamic calculation of performance thresholds. Performance indicators (e.g., type of statistic or projection), such as passing yards or goals, may be received from fantasy sports participants, along with multipliers chosen by the participants. Based on this information, a performance threshold may be calculated that adapts to the chosen multiplier, providing a customized challenge that aligns with the participant's confidence and strategic choices. The performance threshold may be calculated using one or more statistical algorithms, including covariance matrices, machine learning, combinatorial probability, and/or regression models, to compute the probabilities of various outcomes (e.g., win, close win, loss) given the selections. The statistical algorithms may leverage historical data and/or real-time data available at the time that participants select their squares, ensuring that the performance thresholds are accurate and reflective of current conditions.

The performance thresholds may provide a customized challenge that aligns with the participant's confidence and strategic choices, enhancing engagement by introducing strategic depth and maintaining interest by aligning game difficulty with participant expertise and expectations. Furthermore, one or more optimization techniques may be applied to determine payout options for participants. The payout options may satisfy one or more rules and may provide an exciting potential for winning, based on the calculated probabilities and the participant's strategic choices. Thereby the experience of the participant may be enhanced by offering tailored payout scenarios while maintaining financially viability and competitivity.

Real-time data updates and historical performance analysis may be incorporated to further refine the strategic options available to participants. By updating performance thresholds based on live sports event data, the fantasy sports contest may remain relevant throughout the actual event. Additionally, by analyzing historical data, participants may make informed decisions based on a robust dataset that includes past performances of players. These features may collectively enhance the user's ability to make strategic decisions that are informed by both real-time developments and historical trends.

Recognizing the unpredictable nature of sports, performance thresholds may be adjusted based on external factors such as weather conditions, player injuries, and team formations. This adjustment may mimic the fluctuating conditions of real sports games, adding a realistic layer of complexity to the fantasy sports contest. Participants may consider these variables when making strategic decisions, thus enhancing the realism and engagement of the gaming experience. This adaptability may ensure that the strategic gameplay remains challenging and engaging, reflecting the dynamic nature of live sports.

According to some aspects, participants may modify selected multipliers during the fantasy sports contest. This functionality may enable a recalculation of performance thresholds in response to changes in the user's strategy or in reaction to unfolding game events. Such flexibility may empower users to adapt their strategies on the fly, offering a more interactive and responsive gaming experience. This feature may be particularly valuable in maintaining high levels of engagement by allowing users to continuously interact with and influence the game based on their evolving perceptions and strategies.

To further enhance participant interaction, an intuitive user interface may be provided that displays projected award amounts based on various potential outcomes of the fantasy sports contest (e.g., where the outcome is determined based on officially sanctioned sports event results). This visual representation may help participants understand the potential financial implications of their decisions, enabling them to strategically plan their moves based on different risk-reward scenarios. By providing clear and actionable information, participants may be aided in making informed strategic choices that enhance their overall game experience and potential for success.

According to some aspects, live data feeds may be integrated to provide continuous updates on player performances during live sports events. For example, a notification may be transmitted to a participant when there is a change in status associated with a sports player, such as an injury or non-participation in a sporting event. This integration may ensure that participants receive the most current information, keeping them fully informed and deeply engaged throughout the contest. Moreover, the constant flow of data may maintain a high level of excitement and engagement, mirroring the live dynamics of the sports being followed.

Machine learning algorithms may be employed to optimize the determination of performance thresholds based on accumulated data from multiple contests. This use of machine learning may improve the accuracy of performance thresholds over time and may enhance the predictive capabilities of the system. By learning from a broad dataset of user interactions and game outcomes, the fantasy sports contest may continuously improve, offering increasingly refined strategic options to participants.

Aspects of the disclosure may meet the demands of modern fantasy sports enthusiasts for more engaging and interactive experiences and may enhance strategic depth in online sports gaming. Moreover, aspects of the disclosure may significantly enrich the participant's experience, offering a flexible, engaging, and strategically complex gaming environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

Figure 1:
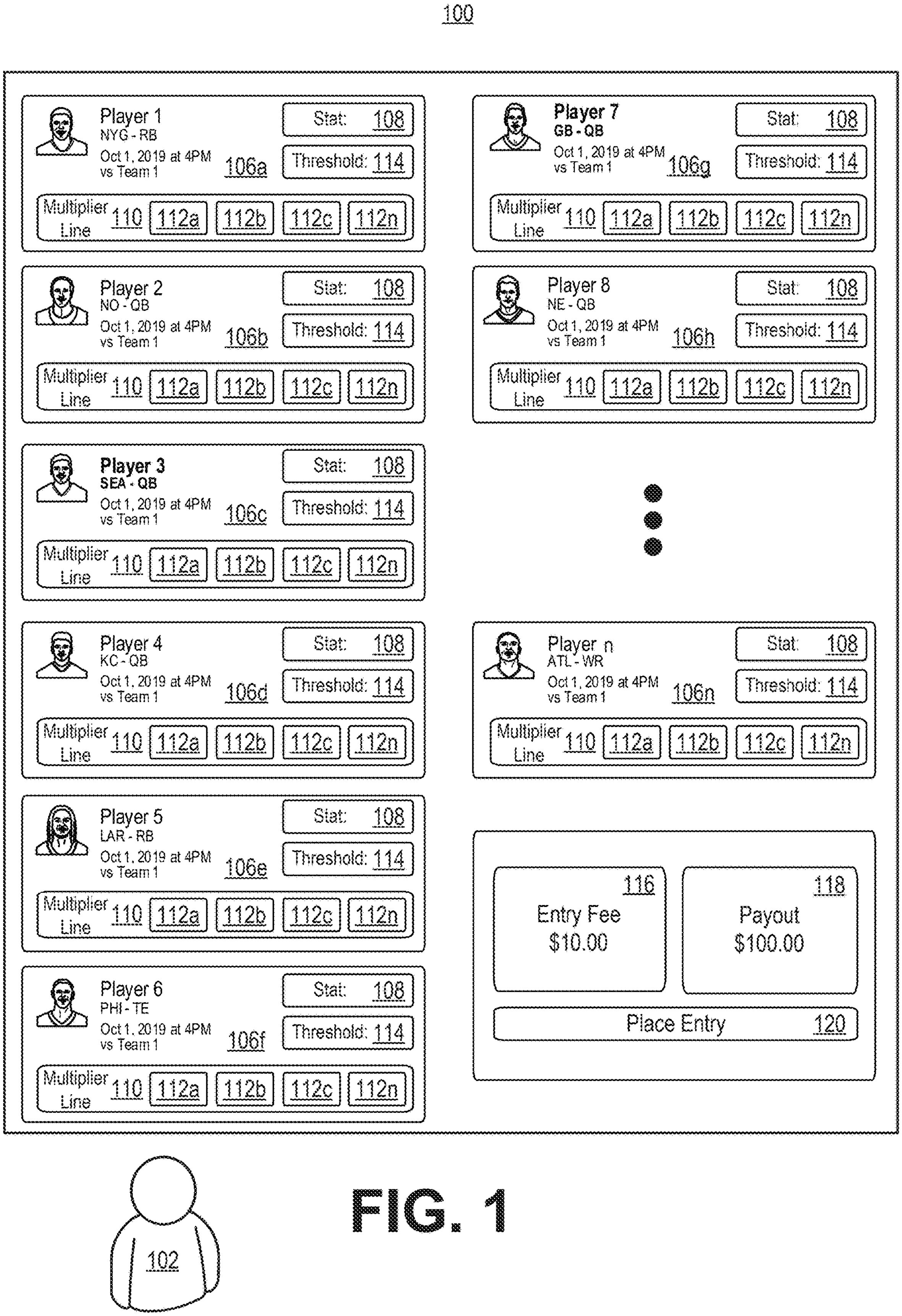
FIG. 1 illustrates an exemplary player selection interface according to various embodiments of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

User. A consumer or participant interacting with the particular product.

Operator. An entity representing a contest (e.g., a fantasy contest) operator or organizer.

Lineup. A collection of squares submitted by a user into the operator's contest in an attempt to win the contest's prize.

Square. A single component of a lineup, based on the performance of an individual player or a combination of players.

Offer. A submission of a lineup.

Correlation. The degree to which two or more quantities are quantitatively related to one another.

Correlation Value. A measurement of correlation which may be a number between 1 and −1. A number close to 1 may mean two factors are positively correlated (e.g., they may rise or fall together and at a similar magnitude), a number close to −1 may mean the two factors are oppositely correlated (e.g., they may rise or fall oppositely and at a similar magnitude), and a number closer to 0 may mean that the two factors may be mostly random to each other, therefore not significantly correlated.

Related Contingencies. Any lineup containing squares within a correlation value that is not equal to zero (e.g., a related contingency may be any lineup that comprises square(s) that has any sort of dependent event).

Payout. An amount of value, relative to lineup and associated entry fee, which will be rewarded upon the lineup's winning the operator's contest.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Referring now to the figures, for the purposes of example and explanation of the fundamental processes and components of the disclosed systems and processes, reference is made to FIG. 1, which illustrates an environment 100 for a fantasy sports contest including a player selection interface 104. As shown in FIG. 1, a player selection interface 104 provides an interface for user 102 to engage deeply in strategic aspects of fantasy sports by selecting a number of players (e.g., players 106*a*-106*n*), cumulatively referred to as players 106, for their participation in contests. The player selection interface 104, as illustrated, represents just one approach or aspect of the present concept, adaptable according to various embodiments of the concept.

Users 102 may interact with the player selection interface 104 through various client devices (e.g., client device 350 illustrated in FIG. 3), broadening accessibility and ensuring that user 102 may engage from any location. One or more selections (e.g., a lineup selection) by user 102 may set forth one or more predictions, introducing a strategic layer to the selection process. Selectable outcomes may be presented by the player selection interface, challenging users to engage deeply with the sports they love and test their analytical skills.

The lineup selection by user 102 within the player selection interface 104 may introduce additional strategic depth to gameplay. User 102 may define the size of their lineup (e.g., comprising one or more players 106), choosing from a range of lineups involving two or more of the selected players 106 and their associated events. An element of strategic management may be introduced as user 102 weighs the likelihood of correctly predicting outcomes against the potential for higher rewards. Upon finalizing their lineup, user 102 may be prompted to choose an entry fee 116, with the player selection interface 104 displaying the potential payout 118 associated with their selections.

The user 102 may select, from a multiplier selectable line 110, from a range of multipliers (e.g., 112*a*, 112*b*, 112*c*, . . . 112*n*) for a chosen player and statistic combination. Unlike traditional models where performance targets are static, the user 102 may influence potential outcomes by selecting a multiplier 112 that modifies the performance threshold 114 according to their strategic insight and confidence. For example, when user 102 selects a multiplier 112, such as 10×, a performance threshold 114 may be calculated that the selected player must meet or exceed to win. For instance, if the multiplier 112 of 10× is applied to Josh Allen's throwing yards, and the average or expected performance is around 250 yards, a challenging performance threshold 114 of 404 yards may be determined. The performance threshold 114 may be determined through a sophisticated algorithm that considers the chosen multiplier 112 and one or more of historical performance data of the player 106, current season stats, and other relevant factors that may affect performance, such as opposing team defense stats or weather conditions.

Moreover, the multiplier selectable line 110 may facilitate a user-friendly interface that displays various multipliers 112, each corresponding to different potential rewards. This arrangement may encourage users to engage in deeper analysis and take calculated risks based on their knowledge of the sport and the players. The multiplier selectable line 110 may also add a layer of excitement and variability to the fantasy sports contest, as the outcome is not merely based on player performance but also on the user's ability to effectively predict and leverage this performance within the context of the game's rules and multiplier effects.

This approach to setting performance thresholds 114 through user-selected multipliers 112 may enhance the gaming experience by aligning it more closely with financial market strategies, where risk and reward are constantly balanced against each other. By integrating real-time data updates and allowing adjustments based on external factors such as player injuries or game-day conditions, all decisions may remain relevant throughout the course of the sporting event, thus maintaining high engagement levels among participants. This adaptive, real-time strategy layer within fantasy sports contests not only caters to the strategic depth and preferences of modern participants but also challenges them to continually adapt and optimize their strategies in pursuit of victory.

Figure 2:
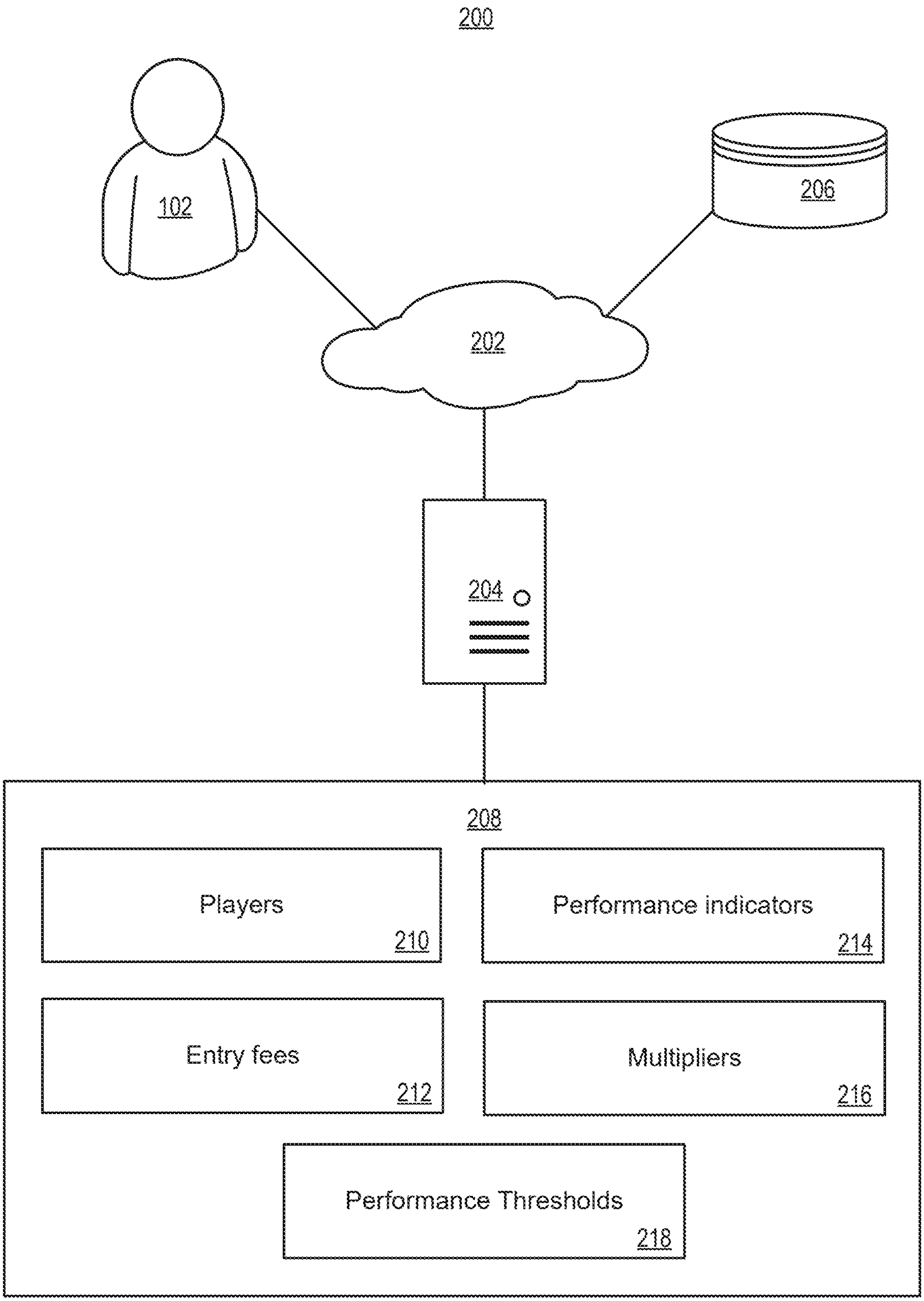
FIG. 2 illustrates an exemplary networked environment according to various embodiments of the present disclosure.

As shown in FIG. 2, an environment 200 for a fantasy sports contest may facilitate interactive fantasy gaming for a user 102. The environment 200 may include a network 202, a server 204, and a database 206. The individual elements of the environment 200, working in concert, may deliver a seamless and engaging fantasy sports experience, leveraging advanced algorithms and data analytics to customize gameplay to suit the strategic preferences and engagement levels of users by personalizing and dynamically adjusting game parameters in response to user selections of players, performance indicators, and multipliers.

The network 202 may provide a versatile and dynamic conduit that enables communication and data exchange across the environment 200. The network 202 may encompass a wide range of connection types, including wired, wireless, and cloud-based technologies, ensuring that user 102 may access the fantasy sports contest platform from virtually anywhere. This connectivity may support real-time interactions and updates, allowing user 102 to make informed decisions based on the latest available information, ranging from player performance data to changes in contest dynamics.

According to some aspects, the server 204 may act as a central processing unit within the environment 200, orchestrating the myriad operations necessary to run the fantasy contests efficiently. The server 204 may handle tasks ranging from user authentication and data processing to the execution of complex algorithms utilized by a multiplier module 208. Moreover, the server 204 may manage flow of information between user 102 and the system, ensuring that user selections and other inputs are accurately recorded and reflected in the contest outcomes.

The database 206 may store a vast array of information associated with the operation of the fantasy sports contests. For example, the database 206 may include one or more of user profiles, player statistics, contest results, contest parameters, and other data points. By maintaining a comprehensive and up-to-date repository of information, the database 206 may enable the server 204 to perform detailed analyses and make informed decisions regarding application of selection of one or more players 210, selection of one or more performance indicators 214, and one or more multipliers 216 to determine one or more contest parameters, e.g., setting performance thresholds 218 for expected outcomes based on the user's selections.

The database 206 may archive numerous forms of data, including one or more of user interaction and preferences, player and game statistics, financial models and structures, multiplier module 208 impact analysis, predictive modeling data, multiplier module 208 definitions and parameters, and/or dynamic adjustment records. The information stored by the database 206 may ensure the server 204 may dynamically and intelligently adjust game parameters (e.g., performance thresholds 218) in real-time, tailoring the gaming experience to individual user strategies and preferences.

User interaction and preferences data may include, but is not limited to, the frequency and contexts in which users select multipliers 216, reflecting their behaviors and strategic inclinations within different sports and contests. The user interaction and preferences data may also capture any explicit user preferences for difficulty levels, e.g., whether they lean towards higher multipliers 216 (e.g., 20×) or prefer a conservative approach with lower multipliers 216 (e.g., 2×). Additionally, the user interaction and preferences data may track the outcomes of these selections, such as wins and losses, and the financial impacts, providing a historical dataset. For example, a user's history may show a pattern of selecting high multipliers 216 (e.g., 20×) for high-stakes NFL games but opting for low multipliers (e.g., 2×) in more unpredictable esports contests. This comprehensive collection of user interaction and preferences may be used to offer personalized experiences, tailor recommendations, and adjust game dynamics in alignment with individual user strategies.

Player and game statistics data may include a wide range of metrics, including individual player performances across various sports, historical game outcomes, seasonal averages, injury reports, and other relevant statistical insights that may influence game predictions and strategies. For instance, the database 206 may include detailed statistics such as a basketball player's points per game, assists, rebounds, shooting percentages, and defensive records, alongside team performance metrics like win-loss records, standings, and recent form. These statistics may be continuously updated to reflect the most current data, ensuring that when multipliers 216 are applied, they are based on the most accurate and relevant information. This data may be used by one or more algorithms, which may calculate different sets of projections (e.g., performance thresholds 218), and personalize the gaming experience by allowing users to make informed decisions when selecting their lineup and applying multipliers 216 to potentially enhance their prize payouts or make it easier to win, but at the consequence of a lower prize payout.

Financial models and structures data may include detailed records of entry fees 212, standard payout ratios, and the mathematical formulas used to adjust performance thresholds 218 in response to the selection of players 210, performance indicators 214, and/or multipliers 216. Such financial data may be used to dynamically calibrate the economic aspects of the game to align with user strategies and preferences, ensuring a balanced and fair play environment. For example, the database 206 may contain information showing that the application of a high multiplier 216 (e.g., 20×) to a user's lineup results in a proportional increase in the potential payout, reflecting the added difficulty of winning. The selection of a lower multiplier 216 (e.g., 2×) could adjust the payout to a smaller amount, catering to users seeking an easier win in a contest, at the cost of a smaller prize payout. This financial data may enable an offering of varied gaming experiences, with a wide range in difficulty levels, accommodating a wide spectrum of user preferences and lineup strategies.

Multiplier module 208 analysis data may include a wide array of analytics, such as the frequency of selection of multipliers 216 by users, the outcomes of contests where multipliers 216 were used (e.g., win-loss ratios), and the financial impact (e.g., changes in performance thresholds 218, entry fees 212, and payouts). Additionally, multiplier 216 analysis data may analyze user behavior patterns, such as tendencies to select certain types of multipliers 216 under specific conditions or in particular sports, and the subsequent success rates of these strategies. For instance, the database may track and analyze scenarios where the application of a higher multipliers 216 (e.g., 20×) significantly increased the payout for a higher difficulty lineup that won a contest, or cases where the use of lower multipliers 216 (e.g., 2×) stabilized a user's performance by providing performance thresholds 218 that were less difficult to win. This comprehensive dataset may not only provide insights into the overall effectiveness and appeal of multipliers 216 but also aid in refining the algorithms to enhance user engagement, satisfaction, and financial outcomes, ensuring a balanced and engaging gaming experience.

Predictive modeling data may include historical game outcomes, player performance statistics, team dynamics, seasonal trends, and user lineup patterns, each of which may be fed into sophisticated machine learning algorithms. The algorithms may analyze patterns and predict future game outcomes, player performances, and the potential impact of specific players 210, performance indicators 214, and/or multipliers 216 based on those predictions. For example, predictive models may evaluate a football player's likelihood of scoring a certain number of touchdowns based on past performance, current fitness levels, and opposition strength. When a user opts to apply performance indicators 214 and/or multipliers 216, the model may adjust its predictions, taking into account the multipliers 216 and recalculating the potential rewards. This predictive modeling data may ensure that multipliers are applied in a contextually relevant manner, enhancing the strategic depth of the game while maintaining fairness and competitiveness. By continuously updating and refining these models with new data, dynamic, engaging, and personalized gaming experiences may be tailored to the evolving landscape of fantasy sports.

Performance threshold definitions and parameters may include detailed descriptions of each difficulty multiplier's function, the conditions under which they can be applied, and the mathematical rules that govern how they alter game parameters such as projection modifiers, performance thresholds 218, entry fees 212, and/or payout ratios. For instance, selection of higher multipliers 216 (e.g., 20×) may be defined to increase the potential payout by a certain percentage but also raise the difficulty level of the prediction criteria, while lower multipliers 216 (e.g., 2×) may be set to decrease the difficulty level by simplifying the prediction criteria but at the cost of a reduced payout. These definitions and parameters may ensure that the application of multipliers 216 is systematic, predictable, and in line with the platform's strategic gaming framework. By storing the multiplier definitions and parameters information, database 206 may enable the platform to dynamically adjust the gaming experience in real-time, providing users with a rich array of strategic options tailored to their preferences and enhancing the overall engagement and competitiveness of the fantasy sports contests.

Dynamic adjustment records data may include changes made to game parameters (e.g., performance thresholds 218) based on players 210, performance indicators 214, and/or multipliers 216. Every adjustment may be logged, including the specific multipliers 216 applied, the pre- and post-adjustment parameters (e.g., players 210, entry fees 212, performance indicators 214, multipliers 216, and performance thresholds 218), and the context of the adjustment (e.g., user selections, game conditions). For example, dynamic adjustment records may include an instance where a user applies one or more multipliers 216 to their lineup and one or more associated performance thresholds 218. These records may serve as a tool for auditing and analyzing the impact of multipliers 216 on the platform's economy and user engagement and may fuel the predictive models and strategic recommendations by providing historical data on user behavior, game outcomes, and financial dynamics. Accordingly, the dynamic adjustment records may enable the platform to offer a continuously optimized, user-centric gaming experience that adapts to changing strategies and preferences.

An assortment of other data points housed within database 206 may include market trends, sports event schedules, real-time sports news, and injury reports, amongst others. This data may be instrumental for the adaptive algorithms employed by server 204. Real-time sports news and injury reports, for example, may have immediate impacts on player statistics and contest outcomes, necessitating swift adjustments to multipliers 216 and contest parameters (e.g., performance thresholds 218) to maintain an equitable contest environment. Market trends, on the other hand, may provide insights into user behavior and preferences, influencing the strategic deployment of multipliers 216 to enhance user engagement and platform loyalty.

A multiplier module 208 may be a software component and/or a specialized component, operating with the server 204 or within the server 204. The multiplier module 208 may receive data from the database 206, including user interactions and preferences, player and game statistics, financial models and structures, multiplier analysis, predictive modeling data, multiplier definitions and parameters, and dynamic adjustment records, to dynamically assign line modifiers through the application of multipliers 216. For instance, the multiplier module 208 may receive player and game statistics for an upcoming NFL game from the database 206 and evaluate, based on the player and game statistics, the current performance metrics of the chosen players. Simultaneously, the multiplier module 208 may reference player performance models to understand the selections of the players 210, entry fees 212, performance indicators 214, and/or multipliers 216 for the game, adjusting one or more performance thresholds 218. Moreover, the players 210, entry fees 212, performance indicators 214, and/or multipliers 216 may be presented to a participant based on the player performance models.

The impact of the multipliers 216 may be further refined by predictive modeling data, which may be used to forecast the players' performances based on historical trends, current conditions, and similar past selections by the user or others with a similar profile. The definition and parameters of the multipliers 216 may provide a framework for quantifying the performance thresholds 218 and potential reward, which may be logged in the dynamic adjustment records for future analysis. For example, the algorithm may adjust the multipliers 216 and/or performance thresholds if the predictive model suggests a high-scoring game for given players 210 and/or performance indicators 214.

The multiplier module 208 may utilize one or more algorithms and real-time data analytics to adjust contest parameters dynamically, ensuring an engaging and strategic fantasy sports experience. By analyzing performance indicators 214, players 210, and multipliers 216, the multiplier module 208 may fine-tune the performance thresholds 218 necessary for winning, enhancing the personalized gaming experience and strategic depth of the platform. These adjustments may be made in consideration of each player's past performances, the current game conditions, and the strategic preferences of the user, which altogether form a data-driven foundation for decision-making within the platform.

Projections associated with the players 210 may provide critical inputs for the multiplier module 208, enabling the adjustment of contest parameters such as performance thresholds 218. One or more projections associated with the selected players 210 may include anticipated performance metrics based on a variety of factors, including historical performance data, current season statistics, and player health. Moreover, participants may select the projections to inform their contest strategies, considering the real-world potential of players 210 within upcoming sports events. This empowers users to strategize based on the anticipated dynamics of the sports events, making the fantasy contest highly interactive and reflective of actual sporting scenarios.

To enhance the accuracy of contest adjustments, the multiplier module 208 may incorporate collective insights from user selections. When a consensus emerges among users regarding a player's expected performance, the multiplier module 208 may adjust the players 210, performance indicators 214, multipliers 216, and/or performance thresholds 218 accordingly. This collective predictive wisdom may be used to keep the contest parameters equitable and competitive, reflecting the shared confidence or concerns among participants regarding specific player performances.

Algorithms employed by the multiplier module 208 may analyze user behavior and projections in depth. A Bayesian updating mechanism may be used to refine the probability of various outcomes based on user inputs. For example, if a significant number of users anticipate an exceptional performance from a typically average player, the module may recalibrate the expected performance thresholds upward, aligning the contest dynamics with user expectations and insights.

The multiplier module 208 may utilize a crowd wisdom aggregation model to assess the accuracy of user projections over time. The crowd wisdom aggregation model may assign weights to projections based on historical accuracy, allowing contest parameters to be adjusted more reliably. For instance, if historical data shows high accuracy in user projections for playoff games, the crowd wisdom aggregation module may adjust the performance thresholds more aggressively during similar future events, maintaining the challenge and competitiveness of the contest.

The economic aspects of the contest, such as potential payouts, may be dynamically adjusted by the multiplier module 208 in conjunction with user selections of players 210, performance indicators 214, and multipliers 216. This economic calibration may align the contest's financial dynamics with user preferences, enhancing user engagement by offering tailored risk-reward scenarios.

Risk assessment algorithms may evaluate the distribution of players 210, entry fees 212, performance indicators 214, and/or multipliers 216 across different outcomes, adjusting contest parameters (e.g., performance thresholds) to ensure a balanced risk across the platform. If a disproportionate amount of entry fees 212 is focused on a particular outcome, suggesting high user confidence, the multiplier module 208 might adjust the multipliers 216 and/or the performance thresholds 218 to balance the financial risk and maintain contest integrity.

An elasticity-based algorithm implemented by the multiplier module 208 may dynamically adjust performance thresholds 218 based on the elasticity of performance thresholds 218 and their associated multipliers 216 relative to entry fees 212. The elasticity-based algorithm may allow the contest parameters to be fine-tuned to maximize user engagement by incentivizing diverse strategic behaviors across different financial commitments.

Furthermore, a machine learning model may predict a distribution of entry fees across various outcomes and uses these predictions to dynamically adjust contest parameters (e.g., performance thresholds 218). The machine learning model may consider historical data on user selection patterns (e.g., associated with players 210, entry fees 212, performance indicators 214, and/or multipliers 216) to forecast available options for upcoming contests, enabling proactive adjustments to available selections to maintain a fair and competitive contest environment. For example, the multiplier module 208 may respond to a concentrated investment in a specific outcome, such as a player achieving a milestone, by adjusting the contest parameters to either increasing available multipliers 216 and/or raising the associated performance thresholds 218.

The multiplier module 208 may implement a weighted projections adjustment model that enhances payout ratios for outcomes associated with higher multipliers 216 and/or performance thresholds 218. This reflects the elevated challenges users are willing to accept, potentially increasing the rewards for achieving unlikely outcomes, thereby matching the increased difficulty level with proportional rewards. A probabilistic threshold adjustment algorithm employed by the multiplier module 208 may recalibrate performance thresholds 218 to reflect user appetite for easier or more challenging contest conditions. For example, selecting low multipliers 216 may result in lower performance thresholds 218 needed for a win but also be associated with a lower payout ratio, effectively balancing the contest's challenge with the expected reward.

According to some aspects, the multiplier module 208 may utilize a machine learning-based evaluation model that dynamically calibrates contest parameters based on the collective impact of multipliers 216 chosen by users. This data-driven approach may optimize the balance between the difficulty of contest conditions and the attractiveness of potential payouts, ensuring the platform adapts to user preferences while maintaining competitive integrity. A feedback loop algorithm implemented by the multiplier module 208 may learn from past contest adjustments. The feedback loop algorithm may refine future contest parameters (e.g., performance thresholds 218) based on user responses to prior selection options, enhancing the platform's ability to respond dynamically to user engagement trends and ensuring ongoing optimization of the contest environment.

Figure 3:
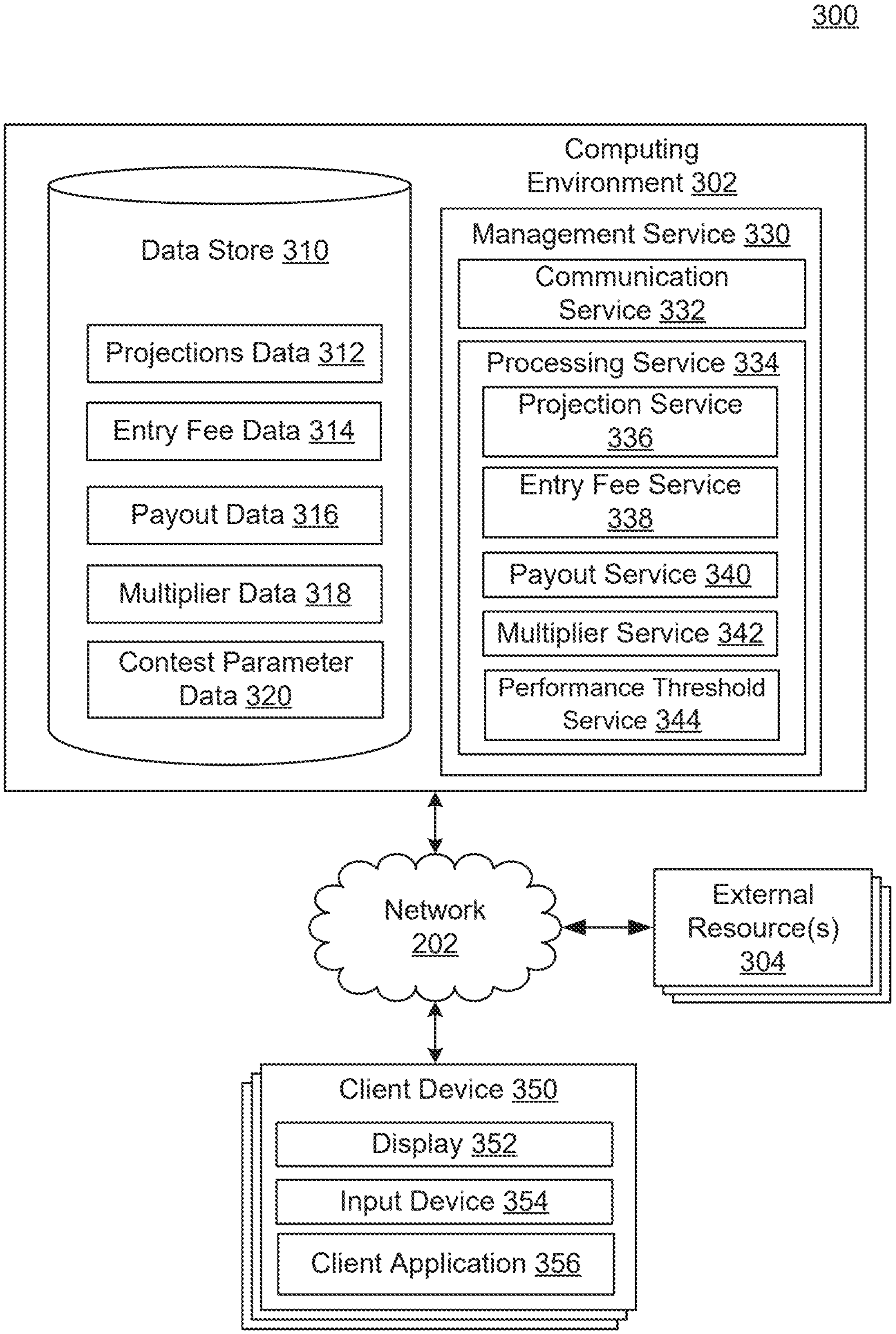
FIG. 3 illustrates an exemplary networked environment according to various embodiments of the present disclosure.

As shown in FIG. 3, the networked environment 300 may facilitate fantasy sports contests, leveraging advanced algorithms and data analytics to apply one or more selected players 210, entry fees 212, performance indicators 214, and/or multipliers 216 to dynamically adjust performance thresholds 218. This networked environment 300 may include a computing environment 302, various external resources 304, and client device 350, one or more of which may be interlinked via a network 202. One or more of the client devices 350 may include a display 352, input device 354, and/or a client application 356. Network 202, including one or more of the Internet, LANs, WANs, and wireless connections, may provide communication within the networked environment 300, including real-time data exchanges, updates, and interactions.

The computing environment 302 may operate within a single device or may span across multiple devices or servers. These devices, potentially distributed across different locations, may work collectively to process, administer, and manage the functionalities associated with the fantasy contests. Moreover, the computing environment 302 may adapt to the computational demands, making it an elastic resource capable of scaling according to the operational needs of the fantasy sports platform. It handles crucial tasks such as lineup processing, outcome determinations, payouts distributions, and analytical data management, positioning it as the central node of the networked environment.

The data store 310 may serve as a repository for an array of data types associated with the fantasy contest's operation, including projections data 312, entry fee data 314, payout data 316, multiplier data 318, contest parameter data 320, and various other datasets that may contribute to the fantasy gaming experience. Each dataset may be used to facilitate the dynamic adjustment of performance thresholds and potential payouts based on the user's selections, including the application of multipliers. The projections data, for example, may encompass detailed information about athletes that users can leverage to make informed decisions when forming their fantasy lineups. This includes performance statistics, team affiliations, and event-specific data that are essential for the analytical algorithms to evaluate and apply the appropriate projections for the operator to set for contests.

Projections data 312 may include detailed information about the athletes around which the fantasy sports contests revolve. Projections data 312 may include performance statistics, team affiliations, and event-specific data that user 102 may leverage to make informed decisions when forming their fantasy lineups. By pulling in this data from external resources 304, the computing environment 302 may ensure that user 102 has access to current and comprehensive player information.

According to some aspects, projections data 312 may include identification and contextual information about athletes, including but not limited to, the player's name, the team they represent, the sport they participate in, and their specific role or position within the team. This athlete information may be associated with allowing user 102 to recognize and select players based on team compositions, individual preferences, or strategic considerations aimed at optimizing their fantasy team's performance. Projections data 312 may further integrate a broad spectrum of performance statistics for each athlete. These statistics may provide quantitative measures of a player's contributions to their team's efforts, including scoring, assists, defensive achievements, and other relevant performance metrics. Detailed statistical information may enhance the fantasy sports experience by influencing the points accrued by users' fantasy teams based on real-world athlete performances.

To further enrich the decision-making process, projections data 312 may include additional contextual variables that may influence an athlete's performance. These contextual variables may include data on a player's teammates, the leagues and competitions they are involved in, and upcoming sporting events they are scheduled to participate in. This additional layer of information may offer user 102 insights into the dynamics of team synergy, the competitive landscape of various leagues, and the strategic importance of specific events, all of which may inform more nuanced player selection strategies. Moreover, projections data 312 may account for environmental factors such as the geographical location of sporting events and prevailing weather conditions, recognizing their potential impact on game outcomes and individual performances. For example, athletes may exhibit varying performance levels under different weather conditions or at specific venues, influencing the strategic selection of players for fantasy teams.

Historical performance data and analytics included in projections data 312 may afford user 102 a deeper exploration into an athlete's performance trends and potential. Historical data may highlight patterns and consistency in performances over time, while analytics may offer predictive insights, equipping the user 102 with advanced tools to gauge future performance probabilities. Projection data 312 may be dynamically maintained, with continuous updates from a variety of external resources 304, such as sports statistics databases, event data feeds, and other gaming platforms, ensuring that the platform delivers the most current and comprehensive player information possible, enabling users to base their fantasy team selections on the latest available data.

Projection data 312 and entry fee data 314 further refine the contest dynamics by encapsulating the predictive aspects of the contests and the financial commitments made by users. These data points influence the formation of lineups and the structuring of contest payouts, making them fundamental to the strategic depth of the fantasy contests. Projections data 312 may encompass selections (e.g., players, performance indicators, and/or multipliers) made by user 102 concerning player performances within the framework of fantasy sports contests. This dataset may include a collection of users' predictions on various aspects of athletes' performances in upcoming games, including, but not limited to, points scored, yards gained, goals made, assists, rebounds, and other sport-specific performance metrics. These projections reflect the users' expectations and strategic choices, based on their analysis or intuition about future sports events.

The projections data 312 may be associated with calculated potential outcomes, and determine payouts based on the accuracy of these user-generated projections. Each entry in the projections data 312 may be linked to one or more of players 210, entry fees 212, performance indicators 214, and/or multipliers 216, serving as an input for algorithms that dynamically adjust performance thresholds 218, contributing to the overall gaming strategy. By aggregating and analyzing these user selections, the system may offer insights into popular trends, potential sleeper picks, and widely anticipated outcomes, enriching the community's collective intelligence.

Projections data 312 may be continuously updated with new user selections and may be maintained to ensure data integrity and relevance. Initial projections may be captured, as well as accommodating changes users might make up to a cut-off time before the actual sporting events, reflecting late-breaking news or last-minute strategic adjustments. As such, projections data 312 may evolve with the sports calendar and the participatory dynamics of the fantasy sports contests, serving as a component of the platform's engagement mechanics and its appeal to users seeking a deeply interactive and competitive fantasy sports experience.

Entry fee data 314 may include data associated with the selection of entry fees by user 102 for participation in fantasy sports contests. The entry fee data 314 may represent the financial engagement of user 102 with the platform, recording the entry fees the user 102 is willing to commit to compete in various fantasy contests. Entry fee data 314 not only captures the amount selected by each participant but also provides data for the economic model of the fantasy sports platform. By aggregating these financial commitments, the system may balance multipliers with associated entry fees and payouts, tailoring contests to meet diverse user preferences.

Moreover, entry fee data 314 may serve an input for several operational and analytical processes within the system. The entry fee date may be used in the calculation of contest payouts, ensuring that winnings are distributed based on predefined criteria reflective of the contest's prize pool and participant performance. Furthermore, entry fee data 314 may reflect selected multipliers.

Payout data 316 may be determined based on the selected players, entry fees, performance indicators, and/or multipliers, as well as the determined performance thresholds. Payout data 316 may include information regarding the potential financial rewards that users stand to gain based on their contest entries, including the selection of players, performance indicators, and the application of multipliers to these selections. This data may be dynamically adjusted and calculated based on a complex interplay between user-selected players, performance indicators, multipliers, the entry fees committed by users, and the performance projections for the athletes involved. The application of multipliers may influence the potential payouts, with higher multipliers generally increasing the difficulty (e.g., by being associated with higher performance thresholds) and, consequently, the potential payouts, while lower multipliers may be associated with less difficulty (e.g., by being associated with lower performance thresholds) along with lower potential payouts.

The storage of payout data 316 may be structured to accommodate the variability introduced by the multipliers, ensuring that the system can accurately reflect changes in potential payouts in real-time. This involves continuously updating the payout structures to mirror the current lineup landscape, user strategies, and the latest performance data. The data store 310 may be used to recalculate potential payouts for users to apply these multipliers to their selections, taking into account not only the base probabilities of the selected outcomes but also the performance thresholds associated with the user's choice of multipliers. This ensures that the payout data remains relevant, precise, and reflective of the current gaming conditions, providing users with up-to-date information on their potential winnings.

Furthermore, the data store 310's handling of payout data 316 enables the fantasy sports platform to maintain transparency and fairness in contest operations. By systematically adjusting payouts based on well-defined algorithms that account for the impact of multipliers and determined performance thresholds, the platform ensures that users are rewarded in proportion to the difficulty level they choose. This approach not only enhances the gaming experience by adding layers of strategic depth and financial decision-making but also fosters a competitive environment where skill and insight are duly rewarded. The meticulous management and storage of payout data, therefore, are instrumental in aligning the platform's economic model with the dynamic and strategic nature of fantasy sports contests.

Multiplier data 318, stored within the data store 310 of the networked environment 300, may allow dynamic adjustment of the performance thresholds associated with contest entries (e.g., players, performance indicators, multipliers, etc.). The multiplier data 318 may include detailed information on multipliers, along with the rules and parameters that govern how these multipliers affect the performance thresholds. The inclusion of multipliers may introduce a strategic element to the contests, enabling users to tailor their gaming experience according to their strategic outlook. The storage of multiplier data 318 may be comprehensive, capturing not only the classification and effect of each multiplier but also the contextual rules and probabilities that dictate the application of these multipliers to the users' selections.

The architecture of the data store 310 may facilitate the organization and retrieval of multiplier data 318, ensuring that the application of multipliers to user entries is both accurate and reflective of the current contest dynamics. The multiplier data 318 may include algorithms and formulas used to calculate performance thresholds and/or adjusted probabilities of outcomes based on the application of multipliers, thereby influencing the potential payouts. The impact of each multiplier may be immediately reflected in the contest setup. As such, the data store 310 may accommodate rapid updates and modifications to the multiplier data, allowing for the introduction of new multipliers or the adjustment of existing multipliers based on gameplay analytics and user feedback.

The data store 310 may include contest parameter data 320, e.g., for the dynamic adjustment of contest dynamics based on user interactions, difficulty preferences, and strategic decisions. The contest parameter data 320 data may encompass a wide array of information, including but not limited to, detailed algorithms for difficulty assessment, parameters for adjusting contest dynamics, and other elements that may contribute to the real-time recalibration of contests in response to user inputs such as players, performance indicators, and multipliers.

For example, contest parameter data 320 may include algorithms that specifically address the recalibration of projections or payout ratios for the cumulative application of multipliers. One such algorithm may be a dynamic projections adjustment algorithm, which may recalculate the difficulty of achievement of specific outcomes based on the overall balance of lineups and/or certain squares placed across different contest outcomes, incorporating the profile alterations associated with application of multipliers. Moreover, if a significant volume of users opts for high multipliers on a high-payout outcome, the algorithm may adjust the projections to reflect the increased exposure assumed by the platform, thus ensuring a balanced distribution.

Another component of the contest parameter data 320 may include adjustment parameters that dictate how user-selected entry fees influence contest dynamics. For example, a scaling algorithm may adjust payout ratios based on an aggregate amount of entry fees committed to particular outcomes, ensuring that payouts remain proportionate to the level of financial engagement by the users. Additionally, the contest parameter data 320 may include one or more parameters for adjusting the performance thresholds in sports contests, directly influenced by the aggregate application of multipliers. An example may include a threshold adjustment algorithm that modifies performance benchmarks, such as points scored by a player in a game, based on the distribution of multipliers across all projections. If the majority of projections or entries on a player scoring above a certain performance indicator come with particular multipliers, the algorithm may raise or lower the performance threshold to maintain contest balance and fairness.

Moreover, the contest parameter data 320 may include machine learning models that learn from past contest outcomes and user lineup patterns to predict and automatically adjust contest parameters in a way that enhances user engagement and platform profitability. For instance, a predictive analytics model may use historical data to identify patterns in user behavior when faced with specific contest setups and adjust the multipliers, entry fee thresholds, or payout structures accordingly to optimize future contest engagement.

The management service 330, situated within the computing environment 302, may perform one or more functions to provide a seamless, engaging, and fair fantasy sports experience. The management service 330 may oversee the reception and processing of user submissions, including user selections and entry fees, ensure the accurate calculation and distribution of contest outcomes and payouts, and determine contest parameters. Moreover, the management service 330 may aggregate and analyze vast data sets related to contest dynamics, user behavior, and performance metrics, facilitating the system's decision-making processes and strategic direction. Furthermore, the management service 330 may be adaptive and scalable, capable of adjusting to fluctuations in user demand and contest complexity. This flexibility may allow the computing environment 302 to support an expanding array of fantasy sports contests, adapt to changes in sporting schedules, and incorporate new features or functionalities as the platform evolves.

The management service 330 may include one or more sub-services such as the communication service 332 and the processing service 334, each responsible for specific operational aspects. The communication service may ensure efficient data distribution and interaction within the networked environment, while the processing service 334 may handle the analytical and computational tasks necessary for the contest's execution. The communication service 332 may manage data exchanges between users' client devices, external resources, and internal computational processes. Moreover, the communication service 332 may ensure the timely and secure transmission of information, facilitating real-time interactions and access to up-to-date contest data, such as user registration details, player selections, and the outcomes of sporting events that influence contest results.

The processing service 334 within the computing environment 302 may execute a broad spectrum of analytical and computational duties associated with the operation and enhancement of the platform. The processing service may include one or more specialized sub-services, including the projection service 336, entry fee service 338, payout service 340, multiplier service 342, and performance threshold service 344, each providing a specific aspect of the fantasy sports contest ecosystem. Cumulatively, these services may perform functions such as outcome prediction, selection assessment, multiplier assessment, entry fee determination, payout determination, contest parameter determination, and the generation of insightful analytics. Through its comprehensive data processing capabilities, the processing service 334 may enable the platform to offer personalized contest experiences, apply multipliers, and continuously enhance the platform based on user feedback and performance analytics.

The projection service 336 may perform analysis and valuation of projections made by user 102. Utilizing projections data 312, projection service 336 may evaluate the selections made by user 102, which may include a range of attributes such as player performance, game outcomes, and statistical milestones. The projection service 336 may aggregate the user selections and assess the choices across various dimensions, including player form, team dynamics, and historical data, to determine a value for the projections by user 102. This value may reflect the expected performance level. Further, the projection service 336 may provide user 102 with insights into the potential outcomes of their fantasy selections. By assigning a projection value, the projection service 336 may allow user 102 to gauge the strength and potential success of their lineup choices relative to the real-world performances of athletes and teams.

The entry fee service 338 may determine the appropriate entry fee for participants in fantasy sports contests. This determination process may incorporate application multipliers, to accurately reflect the difficulty level associated with a user's contest lineup. The entry fee service 338 may utilize a sophisticated algorithm that analyzes the selected multipliers' impact on the potential outcomes of the contest entries.

The payout service 340 may determine the appropriate payouts for fantasy sports contests, including the application of multipliers and associated performance thresholds. This payout service 340 may employ a detailed algorithm that takes into account not only the outcomes of user-selected projections but also the impact of any selected multipliers on those projections. The selected multipliers may adjust the difficulty of achieving specific outcomes related to player performances within the contests by increasing or decreasing performance thresholds. Higher multipliers (e.g., 20×) may elevate the challenge by setting higher performance thresholds, which, if surpassed, may result in significantly higher payouts due to the elevated difficulty involved for the player to reach this performance threshold. Lower multipliers (e.g., 2×) may be associated with lower performance thresholds, making certain outcomes easier to achieve but may offer lower payouts to reflect the reduced difficulty.

One or more algorithms of the payout service 340 may integrate comprehensive data, including historical performance statistics of players, predictive analytics, and real-time performance data, to assess the adjusted probability of achieving the user selected players, performance indicators, and multipliers. This assessment may influence the calculation of payouts, ensuring that they are proportionate to the actual difficulty undertaken by the user. For example, a user applying a higher multiplier (e.g. 20×) to a player expected to score in a particularly challenging matchup may see a potential increase in payout, acknowledging the lower probability of occurrence. This dynamic adjustment may incentivize strategic adjustments within the platform, making the fantasy sports contests more engaging and competitive.

Moreover, the payout service 340 may maintain transparency in how payouts are determined by providing users with detailed explanations of how multipliers affect their potential winnings. This approach may ensure that users are well-informed about the mechanics behind their contest entries, fostering a sense of fairness and clarity. The service's reliance on accurate and up-to-date multiplier information, combined with its sophisticated analytical capabilities, may ensure that payouts are not only fair but also reflective of the unique configurations of each contest entry. Consequently, the payout service 340 may play a role in promoting a balanced and enjoyable gaming experience, encouraging users to explore various strategic avenues through the judicious application of difficulty modifiers.

The multiplier service 342 may apply multipliers that affect the difficulty of achieving specified performance thresholds. The multipliers (e.g., ranging from 2× to 20×) may directly modify the conditions under which the fantasy sports contest is won or lost. For instance, applying a 10× multiplier to a player's scoring target might transform a moderate performance requirement into a challenging one, thereby increasing the potential rewards while amplifying the difficulty level. The determination of these multipliers is grounded in a mix of algorithmic insight and real-time data, ensuring that each multiplier setting is both challenging and achievable based on historical and current player statistics.

The effects of applying multipliers may include adjusting the performance thresholds needed to win and/or may alter the potential payout amounts. By choosing a higher multiplier, participants may significantly increase their potential winnings as the difficulty of achieving the set performance thresholds escalates. Conversely, opting for lower multipliers may reduce the payout and/or may increase the likelihood of achieving the performance thresholds. This dynamic may allow participants to strategize based on their confidence in a player's upcoming performance and their preferred play style. For example, during a major league baseball game, applying a 15× multiplier to a player expected to hit multiple home runs would drastically increase the payout for achieving this rare feat.

The multiplier service 342 may continuously update and recalibrate multipliers based on a variety of factors including player form, opposition strength, and/or unpredictable elements like weather conditions. The algorithm may ensure that each multiplier is reflective of real-world conditions and participant expectations. The multiplier service 342 may further consider user feedback and historical contest data so that the multipliers remain relevant and enticing to participants. For example, if historical data indicates that multipliers set for quarterbacks on rainy days lead to less participant engagement, the multiplier service 342 may adjust the multipliers downward to maintain interest and fair play.

Moreover, the multiplier service 342 may provide participants with transparent and insightful explanations on how each multiplier was determined and/or its expected impact on the game's outcome. This transparency may foster trust between the participants and the platform and may enhance the user experience by making the decision-making process more informed. Participants may see a detailed breakdown of how different multipliers may affect their potential returns and decide accordingly, making strategic decisions that align with their overall contest strategy. The transparency may cultivate a competitive and engaging platform that rewards skill, strategy, and sports insight.

The performance threshold service 344 may dynamically adjust game parameters based on participant interactions and strategic decisions. The performance threshold service 344 may set specific performance thresholds that a player must meet or exceed during a contest, which are influenced by selected multipliers. For instance, if a participant chooses a 5× multiplier for a football player's touchdown passes, and the player's average is 2 touchdowns per game, the performance threshold may be set to 10 touchdowns for enhanced rewards. This setting may encourage strategic thinking and differentiated decision-making among participants.

Performance thresholds may be determined by an algorithm that considers various factors such as past player performances, opponent strength, and real-time game conditions like weather or player injuries. This data-driven approach may ensure that the thresholds are challenging yet achievable, keeping the contests engaging and fair. For example, in basketball, if a participant selects a high multiplier for a player known to score 20 points per game, the adjusted threshold might require the player to score 40 points, which significantly raises the game's difficulty level.

Furthermore, the performance threshold service 344 may update the performance thresholds in real time to reflect ongoing game events and other dynamic factors. This adaptability may maintain the relevance of the fantasy contest throughout the actual sports event and may mirror the unpredictable nature of sports, thereby enhancing the realism of the fantasy sports experience. For example, participants may see a performance threshold adjust downward for a soccer player if an opposing key defender is injured during the match, offering a strategic advantage to quick-responding players.

To assist participants in understanding and strategizing around these performance thresholds, the performance threshold service 344 may provide a user-friendly interface that displays potential outcomes and their corresponding rewards based on different multiplier scenarios. This transparency may aid participants in making informed decisions on whether to play it safe with lower multipliers or go for higher stakes with larger multipliers, thus deepening their engagement and satisfaction with the fantasy sports platform. This approach not only makes the gameplay more exciting but also leverages the analytical skills of participants, making each contest a test of sports knowledge and strategic planning. In some aspects, a notification may be transmitted to a participant when there is a change in status associated with a sports player, such as an injury or non-participation in a sporting event.

Figure 4:
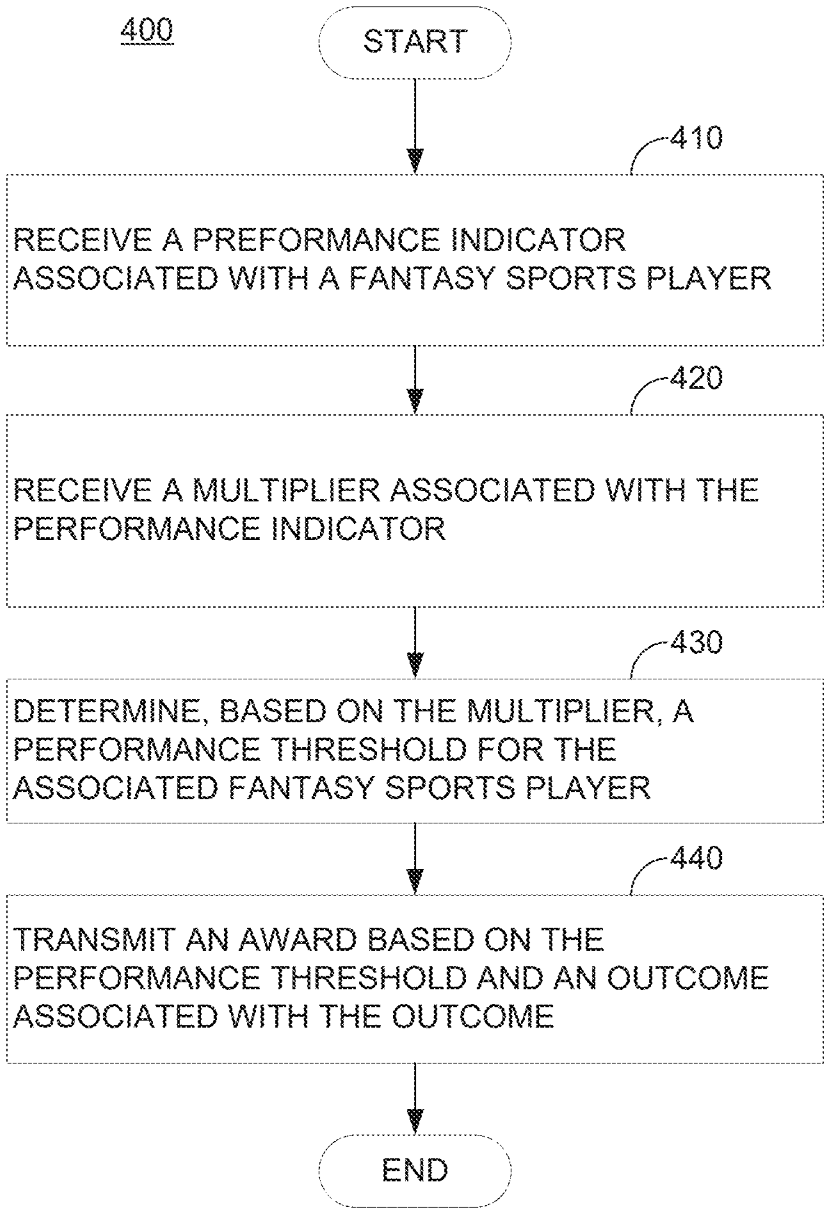
FIG. 4 illustrates an exemplary process for personalizing and dynamically adjusting game parameters in response to user selections according to various embodiments of the present disclosure.

Referring now to FIG. 4, illustrated is a flowchart of a process 400, according to one example of the disclosed systems and processes. The process 400 may demonstrate a technique for dynamically adjusting performance thresholds in response to user selections of players, performance indicators, and multipliers. The process 400 may further demonstrate a technique for determining payouts by applying multipliers and associated performance thresholds.

At box 410, the process 400 may include receiving, from a participant of a fantasy sports contest, a performance indicator (e.g., passing yards, rushing yards, points scored, assists, rebounds, or goals) associated with a fantasy sports player. This data acquisition may occur through an intuitive user interface that participants access, potentially across various devices such as smartphones, tablets, or computers. Through the user interface, participants may input or select performance indicators that reflect their predictions or expectations for real-world performances of athletes within their fantasy lineups. The performance indicators may include metrics such as passing yards for football players, rushing yards, points scored in basketball, assists in hockey, rebounds in basketball, or goals in soccer.

For example, a participant may input that they expect a quarterback to throw for over 300 yards in a football game or a basketball player to score at least 20 points in a match. The inputs may be utilized to adjust gameplay elements dynamically, allowing participants to leverage their sports knowledge in a strategic manner. This approach not only enhances engagement by allowing detailed strategic planning but also increases the stakes of the fantasy contest based on participant confidence and predictions.

Moreover, the reception of the performance indicators through the user interface may allow for a seamless and user-friendly experience, enabling participants to make adjustments easily as the real-world sports events unfold. This functionality may align the fantasy sports contest with live events, adding a layer of realism and excitement by reflecting the unpredictable nature of sports. Participants may update their inputs in real time, based on ongoing games, which allows them to react to injuries, weather conditions, or other unforeseen events that might impact player performance.

At box 420, the process 400 may include receiving, from the participant of the fantasy sports contest, a selection of a multiplier (e.g., selected from a predefined range that includes values from 2× to 20×) associated with the performance indicator. The selection of the multipliers may be made through a user interface that presents a predefined range of multipliers, e.g., varying from 2× to 20×, allowing participants to influence the difficulty and potential rewards of their gameplay based on their confidence in the performance indicators previously submitted. The user interface may be intuitive, making it easy for participants to select or modify their multipliers in real time, adapting their strategy in response to unfolding game events or new insights.

Participants may have the opportunity to select their desired multiplier from a plurality of options displayed on the interface, which provides a variety of strategic possibilities. For instance, choosing a 2× multiplier might be seen as a conservative strategy, suitable when the participant is less certain about a player's performance exceeding the baseline projections. Selecting a 20× multiplier may significantly increase the challenge, ideal for when a participant is highly confident in an extraordinary performance, thus raising the performance threshold required to secure a win but also significantly increasing the potential payout.

The ability to modify a selected multiplier is an additional feature designed to enhance user engagement and responsiveness to game dynamics. After initial selection, participants may adjust their chosen multipliers as the real-time sports event progresses, based on factors such as player performance, injuries, or even weather conditions affecting the game. This flexibility may allow participants to refine their strategies and optimize their chances of success by recalibrating their choices to better align with the evolving conditions of the sports contest.

At box 430, the process 400 may include determining, based on the multiplier, a performance threshold for the associated fantasy sports player. The multiplier may scale the performance indicator, such as passing yards or goals, setting a new threshold that the player must exceed to achieve a successful outcome in the contest. For example, if a participant selects a 10× multiplier for a football player's passing yards, and the player's average performance is 250 yards, the new performance threshold might be set at 2500 yards, significantly increasing the challenge and potential rewards.

To ensure the relevance and accuracy of the performance thresholds, real-time data updates from live sports events may be employed. This feature may allow the system to dynamically adjust the performance thresholds during the contest, accommodating changes such as unexpected player performances or pivotal game events. For instance, if the selected player starts performing exceptionally well early in the game, the system may adjust the threshold upwards to maintain a balanced and challenging contest environment.

Moreover, the process 400 may include a comprehensive analysis of historical performance data of the player. The historical performance data may include previous seasons or matches within the current season, providing a robust basis for setting initial thresholds that are informed by the player's established performance patterns. Adjustments may also be made based on external factors like weather conditions, player injuries, or team formations, adding a layer of strategic complexity and realism to the participant's decision-making process.

Moreover, the performance thresholds may be refined using machine learning algorithms to analyze accumulated data from multiple contests. This machine learning analysis may enable the system to predict performance scenarios and adjust thresholds accordingly. The participant may modify the selected multiplier in response to unfolding game dynamics, triggering a recalibration of the performance threshold. This interaction between real-time data, historical analysis, and participant input may create a dynamic and engaging platform that continually adapts to both the conditions of the sports event and the strategies of the participants, making each contest unique and strategically rich.

At box 440, the process 400 may include transmitting an award to the participant based on the performance threshold and an outcome associated with the selection. The award may be predicated upon both the performance threshold and a specific outcome linked to the participant's selection (e.g., where the outcome is determined based on officially sanctioned sports event results). According to some aspects, the award may be based on whether or not the performance of the athlete exceeds the performance threshold.

Transmitting the award may include several steps to ensure clarity and fairness in the distribution process. Once the performance of the selected player has been validated against the performance threshold and qualifies as exceeding it, the final award amount may be computed. This amount, having been calculated based on the performance exceeding the performance threshold, may be conveyed to the participant through the contest's user interface. The user interface may also display a history of past selections and outcomes, offering participants a detailed record that can inform future strategic decisions.

Comparison of the outcome against the participant's chosen performance threshold may establish whether the participant qualifies for an award. This comparison may include an analysis where the actual performance of the fantasy sports player is measured against the set performance thresholds that have been dynamically adjusted based on the participant's chosen multiplier. For example, if a participant has set a performance threshold of 300 yards for a football player, and the player achieves 350 yards, the award may be calculated.

Algorithms may be used to dynamically calculate potential award amounts that are displayed to the participant via the user interface and/or transmitted to the participant, based on various possible outcomes of the fantasy sports contest. Display of projected awards may allow participants to gauge potential winnings in real-time, adding an additional layer of strategy to their game participation. The display of these projections and the final award transmission may be handled by the system's robust data processing capabilities, ensuring that participants receive timely and accurate updates about their performance and rewards within the contest.

Figure 5:
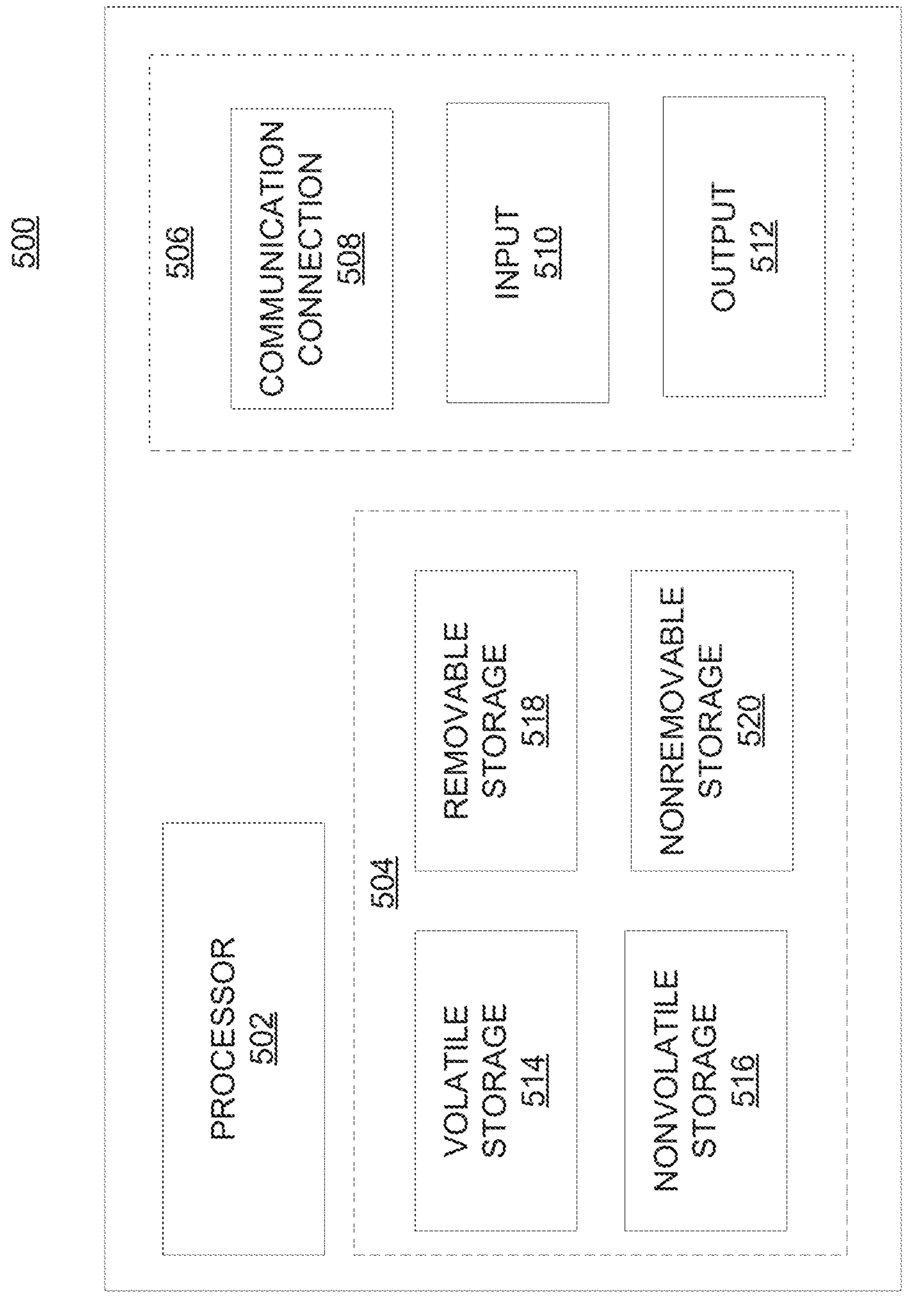
FIG. 5 illustrates a schematic of an exemplary device according to various embodiments of the present disclosure.

FIG. 5 is a block diagram of a computing device 500 that may be connected to or include a component of environment 200. Computing device 500 may include hardware or a combination of hardware and software. The functionality to facilitate fantasy sports contests may reside in one or a combination of computing devices 500. Computing device 500 depicted in FIG. 5 may represent or perform functionality of an appropriate computing device 500, or a combination of computing devices 500, such as, for example, a component or various components of a fantasy sports contest system, a computing device, a processor, a server, a gateway, a database, a firewall, a router, a switch, a modem, an encryption tool, a virtual private network (VPN), a network access control (NAC) device, a secure web gateway, or the like, or any appropriate combination thereof. It is emphasized that the block diagram depicted in FIG. 5 is exemplary and not intended to imply a limitation to a specific example or configuration. Thus, computing device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Computing device 500 may include a processor 502 and a memory 504 coupled to processor 502. Memory 504 may contain executable instructions that, when executed by processor 502, cause processor 502 to effectuate operations associated with a fantasy sports contest. As evident from the description herein, computing device 500 is not to be construed as software per se.

In addition to processor 502 and memory 504, computing device 500 may include an input/output system 506. Processor 502, memory 504, and input/output system 506 may be coupled together (coupling not shown in FIG. 5) to allow communications between them. Each portion of computing device 500 may include circuitry for performing functions associated with each respective portion. Thus, each portion may include hardware, or a combination of hardware and software. Accordingly, each portion of computing device 500 is not to be construed as software per se. Input/output system 506 may be capable of receiving or providing information from or to a communications device or other network entities configured for fantasy sports contests. For example, input/output system 506 may include a wireless communication (e.g., 3G/4G/5G/GPS) card. Input/output system 506 may be capable of receiving or sending video information, audio information, control information, image information, data, or any combination thereof. Input/output system 506 may be capable of transferring information with computing device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/ output system 506 may include a Wi-Fi finder, a two-way GPS chipset or equivalent, or the like, or a combination thereof.

Input/output system 506 of computing device 500 also may contain a communication connection 508 that allows computing device 500 to communicate with other devices, network entities, or the like. Communication connection 508 may include communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with fantasy sports contests, such as functions for personalizing and dynamically adjusting game parameters, as described herein. For example, processor 502 may be capable of, in conjunction with any other portion of computing device 500, dynamically adjusting fantasy sports contest parameters based on user-selected multipliers, as described herein.

Memory 504 of computing device 500 may include a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with fantasy sports contests. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 500. Memory 504 may include executable instructions that, when executed by processor 502, cause processor 502 to effectuate operations associated with fantasy sports contests.

Figure 6:
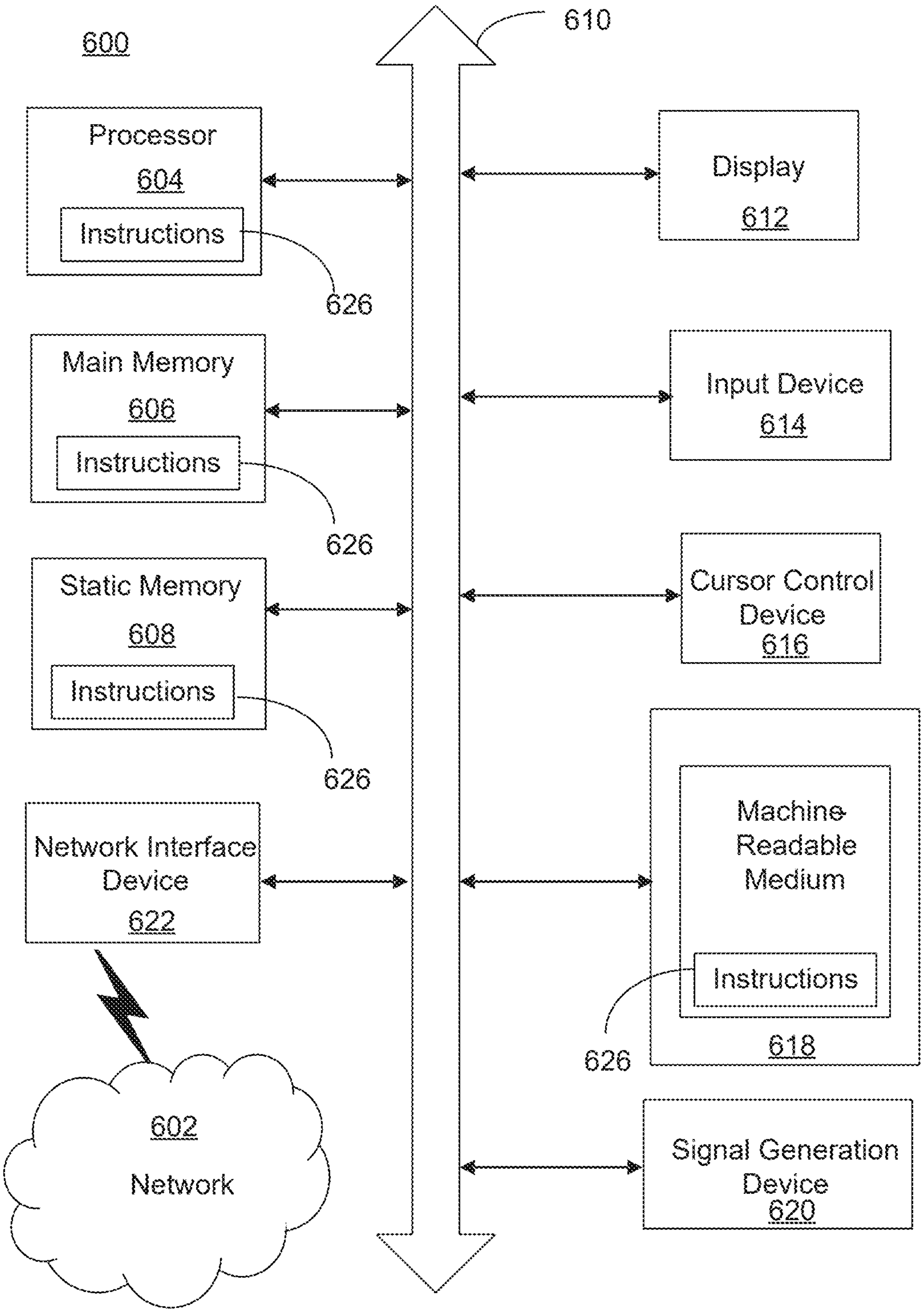
FIG. 6 illustrates an exemplary diagrammatic representation of a machine in the form of a computer system according to various embodiments of the present disclosure.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 502, server 204, database 206, client device 350, and other devices of FIGS. 1-5. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may include a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for fantasy sports contests have been described in connection with various computing devices/processors, the underlying concepts may be applied to any computing device, processor, or system capable of facilitating a fantasy sports contest. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for fantasy sports contests. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with fantasy sports contests as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing fantasy sports contests as described herein. When implemented on a general-purpose processor, the program code combines with the processor to provide a unique device that operates to invoke the functionality of a fantasy sports contest.

While the disclosed systems have been described in connection with the various examples of the various figures, it is to be understood that other similar implementations may be used, or modifications and additions may be made to the described examples of a fantasy sports contest system without deviating therefrom. For example, one skilled in the art will recognize that a fantasy sports contest system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—dynamically adjusting fantasy sports contest parameters based on user-selected multipliers—as illustrated in the Figures, specific terminology is employed for the sake of clarity. The claimed subject matter, however, is not intended to be limited to the specific terminology so selected. In addition, the use of the word “or” is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. One or more computing devices, comprising one or more processors, configured to:

receive, from a participant of a fantasy sports contest via a client application executing on a client device and over a network, a performance indicator associated with a fantasy sports player, wherein the performance indicator comprises a specific statistical category of player performance;

receive, via the client application from the participant of the fantasy sports contest, a selection of a multiplier associated with the performance indicator, wherein the multiplier is selected from a user interface displaying a plurality of multipliers corresponding to different difficulty levels and the plurality of multipliers comprises the multiplier;

determine, based on the selected multiplier and the performance indicator, a performance threshold for the fantasy sports player, wherein the performance threshold is determined using a statistical algorithm comprising at least one of a covariance matrix, a regression model, or a combinatorial probability model, and the performance threshold is based at least in part on historical performance data stored in a database and real-time performance data received by a real-time data feed;

determine a projected payout associated with the performance threshold and an entry fee submitted by the participant;

display, via the client application, the performance threshold and the projected payout to the participant; and transmit an award to the participant in response to the fantasy sports player satisfying the performance threshold during an actual sporting event.

2. The one or more computing devices of claim 1, further configured to adjust the performance threshold based on external factors.

3. The one or more computing devices of claim 1, further configured to allow the participant to modify the selected multiplier, wherein the modification triggers a recalculation of the performance threshold.

4. The one or more computing devices of claim 1, wherein the award is determined proportionally relative to a performance of the fantasy sports player.

5. The one or more computing devices of claim 1, wherein the real-time data feed comprises continuous updates on the performance of the fantasy sports player during the actual sporting event.

6. The one or more computing devices of claim 1, wherein the performance threshold is determined using machine learning algorithms based on accumulated data from multiple contests.

7. The one or more computing devices of claim 1, further configured to determine a plurality of multiplier scenarios and a potential impact on the performance threshold associated with each of the plurality of multiplier scenarios.

8. The one or more computing devices of claim 1, further configured to provide a history of past selections or outcomes associated with the participant.

9. The one or more computing devices of claim 1, further configured to encrypt data associated with the participant.

10. The one or more computing devices of claim 1, wherein the performance threshold is determined based on performance indicators and associated multipliers received from a plurality of participants.

11. The one or more computing devices of claim 1, further configured to transmit a notification associated with a change in status associated with the fantasy sports player.

12. The one or more computing devices of claim 1, wherein the satisfaction of the performance threshold is associated with officially sanctioned sports event results.

13. The one or more computing devices of claim 1, further configured to determine, based on a machine learning model, one or more predicted outcomes associated with the performance indicator and the multiplier, wherein the performance threshold is determined based on the one or more predicted outcomes.

14. A method performed by one or more computing devices, the method comprising:

receiving, from a participant of a fantasy sports contest via a client application executing on a client device and over a network, a performance indicator associated with a fantasy sports player, wherein the performance indicator comprises a specific statistical category of player performance;

receiving, via the client application from the participant of the fantasy sports contest, a selection of a multiplier associated with the performance indicator, wherein the multiplier is selected from a user interface displaying a plurality of multipliers corresponding to different difficulty levels and the plurality of multipliers comprises the multiplier;

determining, based on the selected multiplier and the performance indicator, a performance threshold for the fantasy sports player, wherein the performance threshold is determined using a statistical algorithm comprising at least one of a covariance matrix, a regression model, or a combinatorial probability model, and the performance threshold is based at least in part on historical performance data stored in a database and real-time performance data received by a real-time data feed;

determining a projected payout associated with the performance threshold and an entry fee submitted by the participant;

displaying, via the client application, the performance threshold and the projected payout to the participant; and transmitting an award to the participant in response to the fantasy sports player satisfying the performance threshold during an actual sporting event.

15. A system comprising:

one or more processors; and a memory coupled with the one or more processors, the memory storing executable instructions that when executed by the one or more processors cause the one or more processors to effectuate operations comprising:

receiving, from a participant of a fantasy sports contest via a client application executing on a client device and over a network, a performance indicator associated with a fantasy sports player, wherein the performance indicator comprises a specific statistical category of player performance;

receiving, via the client application from the participant of the fantasy sports contest, a selection of a multiplier associated with the performance indicator, wherein the multiplier is selected from a user interface displaying a plurality of multipliers corresponding to different difficulty levels and the plurality of multipliers comprises the multiplier;

determining, based on the selected multiplier and the performance indicator, a performance threshold for the fantasy sports player, wherein the performance threshold is determined using a statistical algorithm comprising at least one of a covariance matrix, a regression model, or a combinatorial probability model, and the performance threshold is based at least in part on historical performance data stored in a database and real-time performance data received by a real-time data feed;

determining a projected payout associated with the performance threshold and an entry fee submitted by the participant;

displaying, via the client application, the performance threshold and the projected payout to the participant; and transmitting an award to the participant in response to the fantasy sports player satisfying the performance threshold during an actual sporting event.

* * * * *